PARITY GENERATOR

Filed Sept. 28, 1956

INVENTOR.
David L. Nettleton
BY Morris Kahn
ATTORNEY

United States Patent Office 2,894,684

Patented July 14, 1959

2,894,684

PARITY GENERATOR

David L. Nettleton, Haddonfield, N.J., assignor to Radio Corporation of America, a corporation of Delaware Application September 28, 1956, Serial No. 612,778

10 Claims. (Cl. 235—92)

Figure 1:
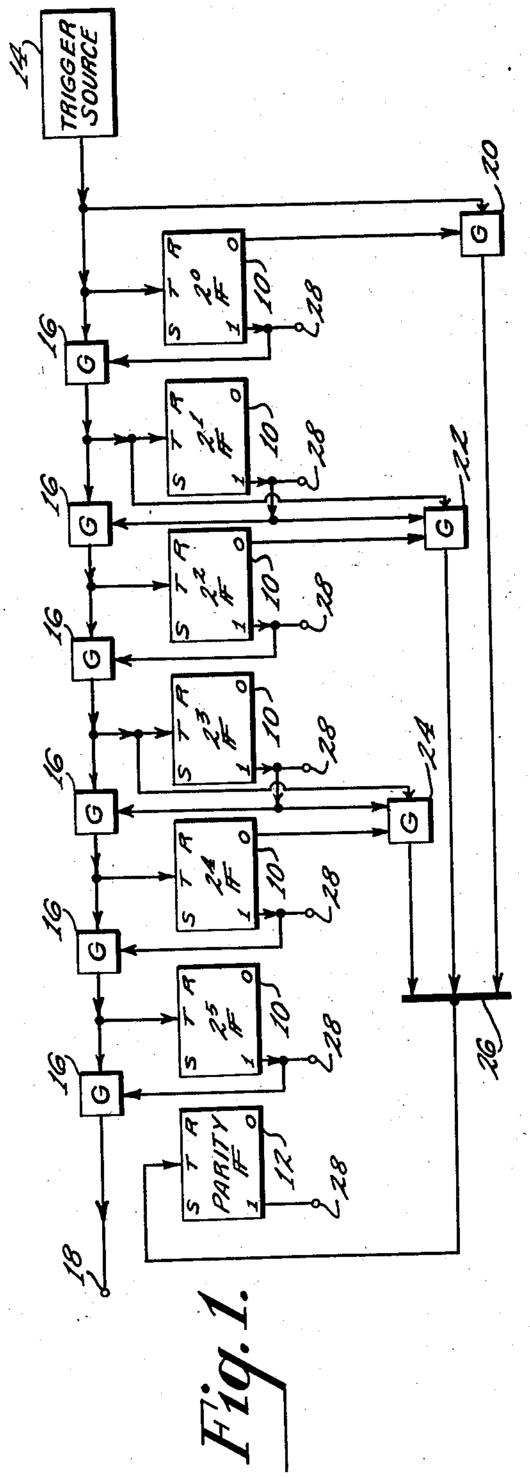

This invention relates to an error control system for a counter, and more particularly to a novel apparatus for maintaining correct parity in a binary counter.

Prior systems which have been devised for checking the correct operation of counters have included the use of a second counter of the same type and the same number of stages as the counter to be checked. The two counters are then pulsed simultaneously, and the resultant counts compared with each other. Other systems detect errors in the operation of a counter by recognition circuitry for ascertaining that at least one stage of the counter operates for each incoming pulse to be counted. In such a system, as long as at least one stage so operates, no error is indicated.

Many errors in systems operating upon code information can be detected by introducing a certain amount of redundancy into the coded information itself. One method of introducing redundancy in a code is described in an article by R. W. Hamming entitled "Error Detecting and Error Correcting Codes" in the Bell System Technical Journal, volume 29, pages 147–160, April 1950. According to the Hamming article, a single binary bit is added to a binary number such that the number of "one" in every binary representation is always odd or always even as desired. This additional binary bit is known as the parity bit. Systems for checking if the correct parity is present are known as parity checking systems.

An object of this invention is to provide a novel system of maintaining the correct parity representation in a binary counter.

Another object of the invention is to provide a system which performs parity generation as it counts.

Still another object of this invention is to provide a novel system for maintaining a parity bit for a counter-register upon the occurrence of each input signal to be counted, which system is economical of the amount of additional equipment.

These and other objects of this invention are achieved by providing, in a system having a counter having $n$ stages, an additional stage for holding a parity bit, and certain gating circuitry. This gating circuitry is coupled to the output of certain of the counter stages to trigger the parity stage each time an input pulse to be counted causes an odd number of counter stages to change state from either "zero" to "one" or "one" to "zero." In this manner, as may be proved, whether even parity or odd parity is employed, the system maintains the correct parity at all times. The invention may also be embodied in a reversible counter.

Figure 2:
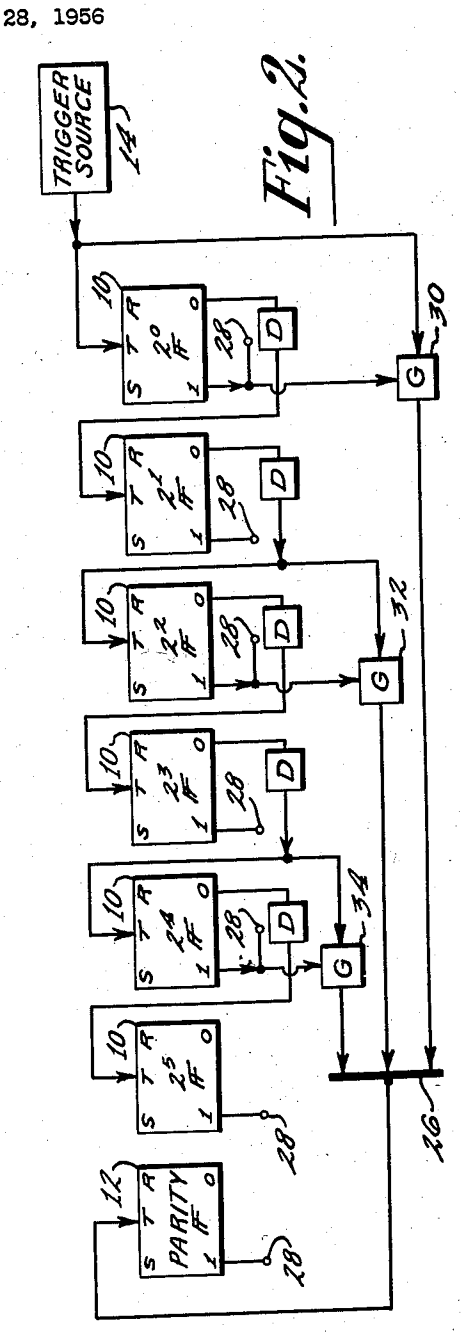

The novel features of this invention as well as the invention itself, both as to its organization and method of operation, will best be understood from the following description, when read in connection with the accompanying drawing, in which like reference numerals refer to like parts, in which:

Figure 1 is a block diagram of an embodiment of this invention, wherein parity bit generating circuitry is associated with the successive pairs of stages of a counter having a high speed carry, and, Figure 2 is a block diagram of another embodiment in accordance with this invention, wherein parity generating circuitry is associated with the stages of a serial type binary counter.

Figure 1 illustrates a counter having a high speed carry of the type described on pages 194–195 in the publication of R. K. Richards entitled "Arithmetic Operations in Digital Computers," D. Van Nostrand Company, Inc., 1955. The counter illustrated is a six-stage counter wherein each stage represents a binary bit $2^0$–$2^5$, inclusive. Each stage shown may, for example, be a flip-flop.

A flip-flop, as is further described on pages 47 and 48 of the Richards publication, is a circuit having two stable states, that is, conditions, and may have two input terminals, one of which may be designated as "reset," the other "set." The flip-flop may assume the set condition by application of a high level (or pulse) on the set input terminal S or the reset condition by the application of a high level (or pulse) on the reset terminal R. Two outputs are associated with the flip-flop circuit which are given the Boolean tags of "one" and "zero." If the flip-flop is in its set condition (that is, set) the "one" output voltage is high and the "zero" output voltage is low. If the flip-flop is reset (that is, in its reset condition) the "one" terminal is low and the "zero" terminal is high. The flip-flop may be provided with a trigger input terminal T. Upon the application of a pulse to the trigger terminal T, the flip-flop assumes the other condition from the one it was in when the pulse was applied. Counters are formed from flip-flops in a known manner, as, for example, described in the above Richards publication.

The counter of Figure 1 includes a plurality of flip-flop stages 10 and 12, shown as blocks labeled with a stylized double F. Each stage 10 corresponds, respectively, to the six orders of a six digit binary number designated, respectively, by the six powers of two from zero to five. The seventh flip-flop 12 corresponds to the parity digit. A source of trigger pulses 14, which may, for example, come from a computer system providing the pulses to be counted, is coupled to the trigger input T of the $2^0$ (lowest order) counter stage 10 and to one input of a two-input high speed carry "and" gate 16. The remaining input to this carry "and" gate 16 is from the "one" output of the $2^0$ counter stage 10. This two-input carry "and" gate has an output which is coupled to the trigger input T of the next higher order counter stage (the $2^1$ stage) and to one of the inputs of the next similar carry "and" gate 16 between the $2^1$ and $2^2$ counter stages. These gates are sometimes called "high speed carry" gates. Additional high speed carry "and" gates 16 are provided for coupling each of the remaining counter stages $2^2$–$2^5$ to a succeeding higher order stage. The high speed carry "and" gate 16 for the $2^5$ stage is coupled to an output terminal 18 from which counter overflow pulses may be taken. The common ground terminal is not shown.

The "and" gates employed herein are all logic "and" gates which provide an output signal upon the simultaneous occurrence of signals of the proper polarity at each of its input terminals. These "and" gates are indicated in the drawing by rectangles with an inscribed G. The priming leads (input) of each of the gates are indicated by arrows directed toward the rectangles and the output of each of the gates by an arrow leaving the rectangle. The arrows at the inputs and outputs employed for each of the counter stages 10 and the parity stage 12 indicate the direction of flow of signal information. Further, a junction in a circuit connection is indicated by an arrow pointing into the junction in the direction of information flow and the output from the junction by arrows directed away from the junction also in the direction of information flow.

To maintain the correct parity at all times, three additional "and" gates 20, 22, and 24 are provided. These "and" gates, which may be termed parity "and" gates, are associated with respective pairs of the counter stages 10. Thus, the first parity "and" gate 20 is associated with the $2^0$ and $2^1$ counter stage 10, the second parity "and" gate 22 is associated with the $2^2$ and $2^3$ counter stage 10, and the third parity "and" gate 24 is associated with the $2^4$ and $2^5$ counter stages 10.

The first parity gate 20 is a two-input gate receiving one input from the trigger pulse source 14 and the remaining input from the "zero" output of the $2^0$ counter stage 10. The second parity "and" gate 22 is a three-input "and" gate receiving its inputs, respectively, from the "one" output of the $2^1$ counter stage, the high speed carry (through the lowest order gate 16) from the $2^0$ counter stage, and the "zero" output of the $2^2$ counter stage 10. The third parity "and" gate 24, similar to the second parity "and" gate 22, receives its three inputs, respectively, from the "one" output of the $2^3$ counter stage 10, from the high speed carry from the $2^2$ counter stage 10, and from the "zero" output of the $2^4$ counter stage 10. The output of each of the parity "and" gates 20, 22, and 24 is coupled through an "or" circuit 26 to the trigger input T of the parity flip-flop 12. The "or" circuit 26 is illustrated by three arrowheads perpendicular to a line and provides an output for an input signal present from any of the parity gates 20, 22, and 24.

The "one" output of each of the $2^0$–$2^5$, inclusive, counter stages 10, as well as that of the parity flip-flop 12, is coupled each to an individual output terminal 28. These output terminals 28 may, for example, be coupled to some output utilization apparatus (not shown) which would include a parity check circuit. A suitable parity check circuit is shown and described in Patent No. 2,719,959, issued October 4, 1955, to L. C. Hobbs and assigned to the same assignee of the present application. The counter may be checked for correct parity as desired.

In operation, assume that the counter initially registers a "zero," that is, that each of the stages $2^0$–$2^5$, inclusive, have the "zero" output high. Assume also that an even parity is employed, wherein the total number of "ones" in a given coded representation of a number, including the partity bit, is even. With the counter registering a "zero," the parity flip-flop 12 must also be "zero" to maintain the even parity, i.e., the total number of "one" bits is "zero," an even number. Counter operation beings with the introduction of a single trigger pulse from the trigger source 14. This trigger pulse passes through the first parity "and" gate 20 which is primed by the high "zero" output of the $2^0$ stage 10 of the counter and through the "or" circuit 26 to the trigger input of the parity flip-flop 12. Simultaneously, the trigger pulse from the trigger source 14 also triggers the $2^0$ stage of the counter from the "zero" condition to the "one" condition. A similar change of state takes place in the parity flip-flop 12. Since the "one" output of the $2^0$ stage was previously low, the trigger pulse is unable to pass through the high speed carry gate 16 associated with the $2^0$ counter stage. Counter operation ceases and a correct even parity is maintained. "One" bits are present in the $2^0$ counter stage and the parity flip-flop 12.

Upon the occurrence of a second pulse to be counted from the trigger source 14, the high speed carry gate 16 associated with the output of the $2^0$ counter stage is now primed by the "one" output of the $2^0$ stage. The second pulse to be counted therefore changes the $2^0$ stage from "one" to "zero" and the $2^1$ stage from "zero" to "one." Since two changes (an even number) occurred, the parity remains correct. No change in state of the parity stage 12 occurs. The first parity gate 20 is inoperative since the $2^0$ counter stage is in a "one" state when the trigger pulse is applied. The second parity gate 22, receiving no priming input from the $2^1$ counter stage 10, blocks the high speed carry signal from the first high speed carry gate 16. The third parity gate 24 is inoperative, since it receives no high speed carry signal. With each of the parity gates 20, 22, and 24 inoperative, the state of the parity stage 12 remains the same.

The operation of the circuit upon the receipt of successive pulses to be counted is indicated in the table below. The table shows the first 16 conditions assumed by the counter, and also indicates by a "1" in the appropriate tabular position the output pulses from the first two parity gates 20 and 22, as the counter is triggered by the corresponding pulses to be counted. The same line shows the state of the counter as a result of a pulse thus applied. The resulting change in the parity flip-flop is indicated in the column headed P. A "1" in any column corresponding to a flip-flop stage indicates that the corresponding flip-flop assumes the set condition. A "zero" indicates that the corresponding flip-flop assumes a reset condition.

*Table 1*

| Count | P | $2^3$ | $2^2$ | $2^1$ | $2^0$ | G-20 | G-22 |
|---|---|---|---|---|---|---|---|
| 0 | 0 | 0 | 0 | 0 | 0 | 0 | 0 |
| 1 | 1 | 0 | 0 | 0 | 1 | 1 | 0 |
| 2 | 1 | 0 | 0 | 1 | 0 | 0 | 0 |
| 3 | 0 | 0 | 0 | 1 | 1 | 1 | 0 |
| 4 | 1 | 0 | 1 | 0 | 0 | 0 | 1 |
| 5 | 0 | 0 | 1 | 0 | 1 | 1 | 0 |
| 6 | 0 | 0 | 1 | 1 | 0 | 0 | 0 |
| 7 | 1 | 0 | 1 | 1 | 1 | 1 | 0 |
| 8 | 1 | 1 | 0 | 0 | 0 | 0 | 0 |
| 9 | 0 | 1 | 0 | 0 | 1 | 1 | 0 |
| 10 | 0 | 1 | 0 | 1 | 0 | 0 | 0 |
| 11 | 1 | 1 | 0 | 1 | 1 | 1 | 0 |
| 12 | 0 | 1 | 1 | 0 | 0 | 0 | 1 |
| 13 | 1 | 1 | 1 | 0 | 1 | 1 | 0 |
| 14 | 1 | 1 | 1 | 1 | 0 | 0 | 0 |
| 15 | 0 | 1 | 1 | 1 | 1 | 1 | 0 |

The manner in which the table may be interpreted will be clear from an example. Consider the first row of the table. This row indicates that the counter is completely reset and indicates an initial count of "zero." A pulse from the trigger source 14 passes through the gate 20 to trigger the parity stage from "zero" to "one." The output from the first parity gate 20 is indicated as a "1" in the second row of the table in the G-20 column. The trigger input also triggers the $2^0$ counter stage from "zero" to "one." The state of the counter and the parity stage appears from the second row of the table as 10001. Even parity is maintained.

In summary, each parity gate is associated with a different one of successive pairs of stages. Each parity gate for each pair of counter stages determines if a single input pulse to be counted will cause one or both of the associated counter stages to change their state. If only one of the counter stages of a pair associated with any parity "and" gate changes state, the number of stages changing state is odd and the parity flip-flop also changes state. Thus, of the three inputs to each of the parity gates 22 and 24, two are the same as those to the high speed carry gate 16 from the preceding counter stage. These two inputs determine whether or not a "carry" is to pass to the next higher order stage. The third and last input to each parity "and" gate is from the "zero" output of the lower order one of the pair of stages associated therewith. With this latter mentioned stage in a "zero" condition, no carry to a higher order stage through the carry gates 16 can occur.

Thus, the logic of any of the parity gates provides an output to change the state of the parity flip-flop whenever an incoming pulse to be counted causes the change of state in only one stage of a pair of associated counter stages. By associating a parity "and" gate with every pair of counter stages in the manner taught above, an $n$ length counter may be constructed. If $n$ is an odd number, the last (highest binary order) stage of the counter is somewhat modified to maintain correct parity. Each time this highest order odd stage changes state from "zero" to "one" or "one" to "zero" the parity flip-flop should also change state to maintain parity. Thus, the trigger input to the highest order odd stage from the preceding lower binary order stage is also coupled through an "or" circuit to the trigger input T of the parity flip-flop 12. If, for example, a $2^6$ binary stage (not shown) were added to the counter of Fig. 1, the output terminal 18 (shown) is coupled through the "or" circuit 26 to the trigger input T of the parity flip-flop 12 in addition to being coupled to the trigger input T of the $2^6$ stage.

In the counter, the parity flip-flop 12 may be considered as either part of the counter as, for example, an additional stage, or it may be considered as a separate parity flip-flop.

It is noted that by means of the set terminals S of each of the counter stages 10 and the parity flip-flop 12, the binary representation of any desired number, with the correct parity, may be readily inserted into the counter of Fig. 1, and the counter be employed as a counter or a register. After the binary representation of the number is set into each of the counter stages, successive pulses to be counted from the trigger source 14 will modify the contents of the counter-register and the correct parity will be maintained at all times.

In the alternative, two-input parity gates may be employed. One of the two inputs is taken from the "zero" output of the lower order one of the associated pair of counter stages. The other input may be taken from the carry from the preceding lower order stage. In the diagram of Fig. 1, such a carry input to the third parity gate 24, for example, would be taken from the output of the carry gate 16 coupled to the trigger input T of the $2^4$ counter stage 10.

In Figure 2, an elementary counter of a type using a so-called "serial carry," modified according to the invention, is shown. A counter of this type without the modification is described in the above-mentioned Richards publication, in particular on page 194. The serial carry pulse is the differentiated output from the preceding lower order stage in this type of counter and this pulse provides the parity gate carry input.

The counter illustrated in Figure 2 counts in the reverse (negative) direction. The "zero" output of each stage is coupled through a differentiating circuit to the trigger input of a succeeding stage. These differentiating circuits are indicated in the drawing by rectangles with an inscribed D. In this manner, whenever the state of the lower order stage changes from "zero" to "one," the otherwise steady state output signal is differentiated to yield the desired pulse type signal to the succeeding higher order stage. A diode may be employed in the differentiating network to allow only one polarity signal to pass to the trigger input of the succeeding stage. Three, two-input parity "and" gates 30, 32, and 34, respectively, are provided. The first parity "and" gate 30 has one input from the trigger source 14 and the other input from the "one" output of the $2^0$ flip-flop counter stage 10. The second parity "and" gate 32 receives one input from the "one" output of the $2^2$ counter stage and the second input from the differentiating circuit coupled to the "zero" output of the $2^1$ counter stage. Thus, the carry output from the $2^1$ counter stage is taken from the differentiated output of the "zero" output terminal of the $2^1$ stage as described in the Richards article. In a similar manner, the third parity "and" gate 34 receives the carry output from the $2^3$ stage via a differentiating circuit D and from the "one" output from the $2^4$ counter stage. The outputs of each of the parity "and" gates 30, 32, and 34 is coupled through the "or" circuit 26 to the trigger input terminal T of the parity stage 12.

In operation, assume that even parity is employed and that the counter is presently registering the binary representation of the number four which in binary form is 1000100. The "one" parity bit in the $2^6$ binary position provides even parity. Upon the application of a count down pulse from the trigger source 14, the $2^0$ stage changes state from "zero" to "one." The $2^0$ stage "zero" output provides a carry signal to the $2^1$ counter stage 10. The $2^1$ counter stage 10 also changes state from "zero" to "one" and a carry signal passes to the $2^2$ counter stage 10 and to the second parity gate 32. The $2^2$ counter stage changes from "one" to "zero" and produces no carry. The first parity "and" gate 30, having no priming input from the initially low "one" ouput of the $2^0$ counter stage stage 10 (at the time of the count pulse) is closed. Note that no output resulted from the first parity gate 30 because of the low "1" output at the time of application of the trigger source pulse. However, the second parity gate 32, being primed by the "one" output of the $2^2$ counter stage 10, passes the carry from the $2^1$ stage "zero" output through the "or" circuit 26 to the parity flip-flop 12. The parity flip-flop changes from the "one" state to the "zero" state. The even parity initially set up in the counter thereby remains the same, with a "zero" bit being present in the parity stage 12, and a "one" bit in each of the $2^1$ and $2^0$ counter stages 10. The counter now registers the binary representation of the number three with correct even parity, that is 0000011. The operation continues in a similar manner upon the receipt of successive input pulses.

The counter of Figure 2 counts in the forward direction, and correct parity is maintained with each input count pulse, if the significance of the "zero" and "one" outputs are interchanged, and outputs are taken from the newly signified "one" outputs. Further, if the counter has an odd number of stages the trigger input to the highest order odd stage is also coupled to the trigger input T of the parity stage as described above for Fig. 1.

The system of this invention finds particular utility in a computer system employing buses and having parity checking circuits coupled to each of the buses. Information, including the count registered by counters, may thus be checked whenever it is entered into or transferred along any of the buses in the system.

There has thus been described a system wherein the correct parity, whether it be even or odd, is maintained for an $n$ length counter with each and every change of count. This counter system which maintains parity is more reliable, faster, and more complete than parity generator systems known in the prior art.

What is claimed is:

1. A parity system comprising a binary counter having a plurality of counter stages in order and a parity stage having two states, means for receiving input signals to be counted, and means responsive to each successive pair of counter stages and to said input signal receiving means for changing the state of said parity stage when only one stage of any pair of said successive pairs of said counter stages changes state in response to one of said input signals to be counted.

2. A parity system comprising a binary counter having a plurality of counter stages connected in cascade and a parity stage having two states, means associated with each of said counter stages for providing a carry output, means responsive to said carry output means of one of said stages of each successive pair of counter stages and to one of said stages of a different one of each of said successive pairs of counter stages for changing the state of said parity stage.

3. A parity system comprising, in combination, a binary counter having a plurality of counter stages connected in cascade and a parity stage having two states, means associated with each of said counter stages for providing a carry output to the succeeding stage, means responsive to alternate ones of said carry output means and to alternate ones of said counter stages for changing the state of said parity stage.

4. A system for maintaining parity in a counter comprising, in combination, a binary counter having a plurality of counter stages and a parity stage, each of said stages comprising a flip-flop having a trigger input, a first output, and a second output complementary to said first output, means for receiving input signals to be counted, a plurality of carry gates connected in cascade with said signal receiving means, each of said gates having an output being associated with a different one of said counter stages for providing a high speed carry, each of said carry gate outputs being coupled to a different one of said flip-flop trigger inputs, and a plurality of means for triggering said parity stage, each one of said triggering means being coupled to alternate ones of said carry gates and to different alternate ones of said counter stages.

5. A system for maintaining parity in a counter comprising, in combination, a binary counter having a plurality of counter stages and a parity stage, each of said stages having two states and comprising a flip-flop having a trigger input and a first output, means for receiving input signals to be counted, a plurality of carry gates connected in cascade with said signal receiving means, each of said gates being associated with a different one of said counter stages for providing a high speed carry, and a plurality of means for changing the state of said parity stage, each one of said state changing means being coupled to alternate ones of said carry gates and to different alternate ones of said counter stages first outputs.

6. A system for maintaining correct parity in a counter, said counter having a first and a second flip-flop stage connected in cascade and a parity flip-flop, each of said stages having a trigger input and a first output, said parity flip-flop having a trigger input, said system comprising means coupled to said first flip-flop stage trigger input for receiving input signals to be counted, and means responsive to said input signal receiving means and to said first flip-flop stage first output to provide a parity signal applied to said parity flip-flop trigger input.

7. A system for maintaining correct parity in a counter for every input signal to be counted, said counter having a first and a second flip-flop stage connected in cascade and a parity flip-flop, each of said stages being connected in cascade and having a trigger input, a first output, and a second output, said parity flip-flop having a trigger input, said system comprising means coupling said input signals to be counted to said first flip-flop stage, and a parity "and" gate having two inputs and an output, said parity gate inputs being responsive respectively to said input signals to be counted and to said first flip-flop stage second output for providing a parity signal, said parity gate output being coupled to said parity flip-flop trigger input, each of said counter stage first outputs representing the count in said counter.

8. In a counter having $n$ binary stages, each of said stages having a first output and a second output complementary to said first output, the improvement characterized by a parity flip-flop having a trigger input, means responsive to each said counter stage first output for providing a carry signal, $r$ parity "and" gates, where $r$ is the integer $n/2$ if $n$ is even and the integer $$\frac{n-1}{2}$$

if $n$ is odd, each of said parity gates being responsive to said carry signal from a different one of each $2k$th counter stage, where $k$ is any integer equal to or less than $n/2$, and to said first output from a different one of said first outputs from each $2k+1$ counter stage, said parity flip-flop being responsive to each said parity gate.

9. In a counter comprising a plurality of flip-flops, each of said flip-flops having a trigger input, a first output, and a second output complementary to said first output, a plurality of coincidence gates connected in cascade, each of said gates being responsive to a different one of said flip-flop second outputs, each of said flip-flop trigger inputs except the first being responsive to a different one of said coincidence gates, the improvement characterized by a parity flip-flop having a trigger input, and a plurality of parity coincidence gates, each of said parity coincidence gates being responsive to alternate ones of said cascaded coincidence means, to said second outputs of alternate ones of said counter flip-flops, and to said first outputs of different alternate ones of said counter flip-flops, said parity flip-flop being responsive alternatively to each of said parity coincidence gates.

10. In a counter comprising a plurality of flip-flops, each of said flip-flops having a trigger input, a "zero" output, and a "one" output complementary to said "zero" output, a plurality of "and" gates connected in cascade, each being responsive to a different one of said flip-flops "one" outputs, each of said flip-flop trigger inputs except the first being responsive to a different one of said "and" gates, the improvement characterized by a parity flip-flop having a trigger input, a plurality of parity "and" gates, each of said parity "and" gates being responsive to alternate ones of said cascaded "and" gates, to said "one" outputs of alternate ones of said counter flip-flops, and to said "zero" outputs of different alternate ones of said counter flip-flops, said parity flip-flop trigger input being responsive alternatively to each of said parity "and" gates.

References Cited in the file of this patent

UNITED STATES PATENTS

| | | |
|---|---|---|
| 2,552,629 | Hamming et al. | May 15, 1951 |
| 2,577,075 | Dickinson | Dec. 4, 1951 |
| 2,674,727 | Spielberg | Apr. 4, 1954 |
| 2,685,683 | Holden et al. | Aug. 3, 1954 |
| 2,719,959 | Hobbs | Oct. 4, 1955 |